(12) United States Patent
O'Neill

(10) Patent No.: US 11,787,373 B2
(45) Date of Patent: Oct. 17, 2023

(54) PASSIVE PEDAL FORCE EMULATOR PEDAL ASSEMBLY

(71) Applicant: KSR IP Holdings, LLC, Wilmington, DE (US)

(72) Inventor: Dan O'Neill, Chatham (CA)

(73) Assignee: KSR IP HOLDINGS, LLC, Wilmington, DE (US)

(*) Notice: Subject to any disclaimer, the term of this patent is extended or adjusted under 35 U.S.C. 154(b) by 0 days.

(21) Appl. No.: 17/825,454

(22) Filed: May 26, 2022

(65) Prior Publication Data

US 2022/0379852 A1    Dec. 1, 2022

Related U.S. Application Data

(60) Provisional application No. 63/193,167, filed on May 26, 2021.

(51) Int. Cl.
*B60T 7/06* (2006.01)
*G05G 5/03* (2008.04)
*B60T 7/04* (2006.01)

(52) U.S. Cl.
CPC ............... *B60T 7/06* (2013.01); *B60T 7/042* (2013.01); *G05G 5/03* (2013.01); *B60T 2220/04* (2013.01)

(58) Field of Classification Search
None
See application file for complete search history.

(56) References Cited

U.S. PATENT DOCUMENTS

| | | |
|---|---|---|
| 6,367,886 B1 | 4/2002 | Shaw |
| 8,449,047 B2 | 5/2013 | Drumm et al. |
| 9,043,086 B1 | 5/2015 | Gauthier |
| 10,137,874 B2 * | 11/2018 | Pennala .................. B60T 7/042 |
| 11,292,338 B2 | 4/2022 | Burke et al. |
| 2005/0082909 A1 * | 4/2005 | Constantakis ........ B60T 8/3255 303/20 |
| 2005/0225167 A1 | 10/2005 | Kunz |
| 2009/0095100 A1 | 4/2009 | Toyohira et al. |
| 2011/0185843 A1 | 8/2011 | Soltys et al. |
| 2015/0101447 A1 | 4/2015 | Kim |
| 2018/0093648 A1 | 4/2018 | Pennala et al. |

FOREIGN PATENT DOCUMENTS

| | | | |
|---|---|---|---|
| DE | 10335598 A1 | 2/2005 | |
| DE | 102010027924 B4 | 7/2017 | |
| FR | 3052886 A1 * | 12/2017 | ............... G05G 1/44 |
| KR | 1020120107017 | 4/2014 | |

* cited by examiner

*Primary Examiner* — Vicky A Johnson

(74) *Attorney, Agent, or Firm* — Dinsmore & Shohl LLP

(57) ABSTRACT

Embodiments herein are directed to an emulator assembly. The assembly includes a housing with a cavity, a pedal arm, an elongated member, a carrier, an end plate and a compressible member. The pedal arm is at least partially received in the cavity and has a pedal pad on one end. The elongated member extends and couples to the pedal arm on one end and couples to a carrier on an opposite other end. The end plate is spaced apart from the carrier. The compressible member is positioned in the space between the carrier and the end plate. When the pedal pad is depressed, the elongated member moves the carrier in a direction towards the end plate which drives the carrier into the compressible member such that the compressible material compresses to generate a force feedback onto a foot positioned on the pedal pad.

20 Claims, 11 Drawing Sheets

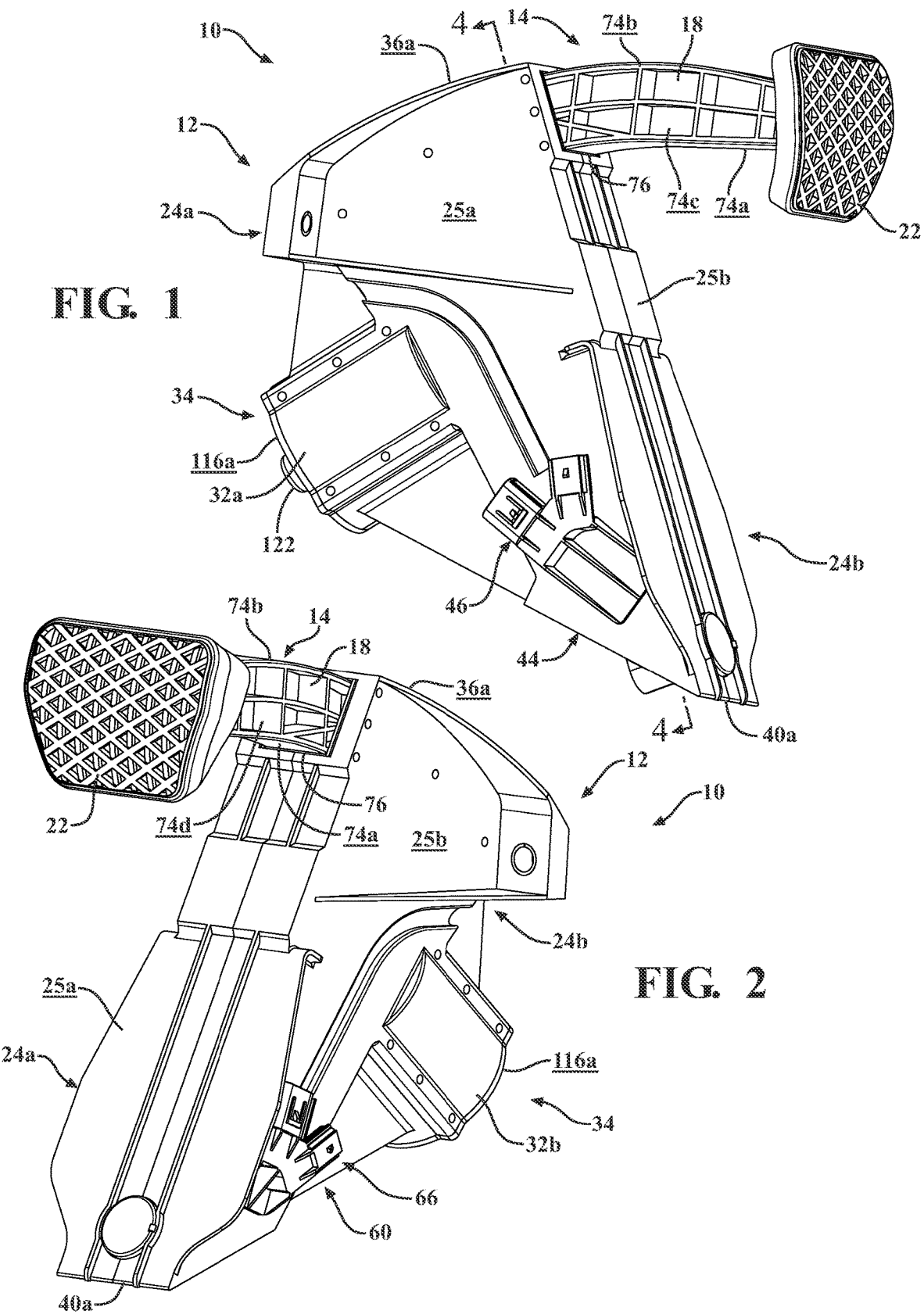

PASSIVE PEDAL FORCE EMULATOR PEDAL ASSEMBLY

CROSS-REFERENCE TO RELATED APPLICATIONS

This utility patent application claims priority benefit from U.S. provisional patent application Ser. No. 63/193,167, filed May 26, 2021 and entitled "Passive Pedal Force Emulator", the entire contents of which is incorporated herein in its entirety.

TECHNICAL FIELD

The present specification generally relates to pedal assemblies for vehicles and, more specifically, to linear passive force emulators for pedal assemblies with a mechanical resistance for damping and hysteresis dependent on a pedal movement.

BACKGROUND

Many braking system are passive driven. However, newer braking system are now e-boost braking system where a boost of the braking system is provide by an electric motor to provide the braking system with an active force. As such, the need for mechanical braking by the operator is reducing and the need for system components to perform the braking on behalf of the operator is increasing. As such, there is a need for passive force emulator to provide a haptic feel to the operator when a pedal is depressed.

SUMMARY

In one embodiment, an emulator assembly is provided. The emulator assembly includes a housing with a cavity, a pedal arm, an elongated member, a carrier, an end plate, and a compressible member. The pedal arm is at least partially received in the cavity. The pedal arm has a pedal pad on one end. The elongated member extends and couples to the pedal arm on one end and a carrier on an opposite other end. The end plate is spaced apart from the carrier. The compressible member is positioned in the space between the carrier and the end plate to be in contact with the carrier and the end plate. When the pedal pad is depressed, the elongated member moves the carrier in a direction towards the end plate which drives the carrier into the compressible member such that the compressible material compresses to generate a force feedback onto a foot positioned on the pedal pad.

In another embodiment, a pedal assembly is provided. The pedal assembly includes a housing that has a cavity, a pedal arm, an elongated member and an emulator assembly. The pedal arm is at least partially received in the cavity. The pedal arm has a pedal pad on one end. The elongated member extends and couples to the pedal arm and to the emulator assembly positioned within the cavity. The emulator assembly including a carrier coupled to the elongated member, a first end plate spaced apart from the carrier, a first compressible member positioned in the space between the carrier and the first end plate, and a second end plate spaced apart from the first end plate. The second end plate has a second compressible member extending from the second end plate into the space between the second end plate and the first end plate to be positioned between the second end plate and the first end plate. When the pedal pad is depressed, the elongated member moves the carrier in a direction towards the first end plate which drives the carrier into the first compressible member such that the first compressible member compresses to generate a force feedback to a foot on the pedal pad. When the first compressible member is fully compressed, the carrier, the first compressible member, and the first end plate compress against the second compressible member to generate a second force feedback onto the foot on the pedal pad. The second force feedback providing a greater hepatic force than the hepatic force of the first feedback.

In yet another embodiment, an emulator assembly is provided. The emulator assembly includes a housing having a cavity, an elongated member, a carrier, an end plate, and a first compressible member and a second compressible member. The elongated member extends and couples to a moveable member at on one end and couples to a carrier on an opposite other end. The carrier is positioned to be movable within the cavity. The end plate is positioned within the cavity. The first compressible member is positioned within the cavity and has a density range from 200 kilogram per cubic meter ($kg/m^3$) to 500 $kg/m^3$. The second compressible member is positioned within the cavity and has a stiffness characteristic of at least 150 newton-millimeters (N/mm).

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 schematically depicts a left side perspective view of a pedal assembly with an emulator assembly according to one or more embodiments shown and described herein;

FIG. 2 schematically depicts a right side perspective view of the pedal assembly of FIG. 1 according to one or more embodiments shown and described herein;

DETAILED DESCRIPTION

Figure 3:
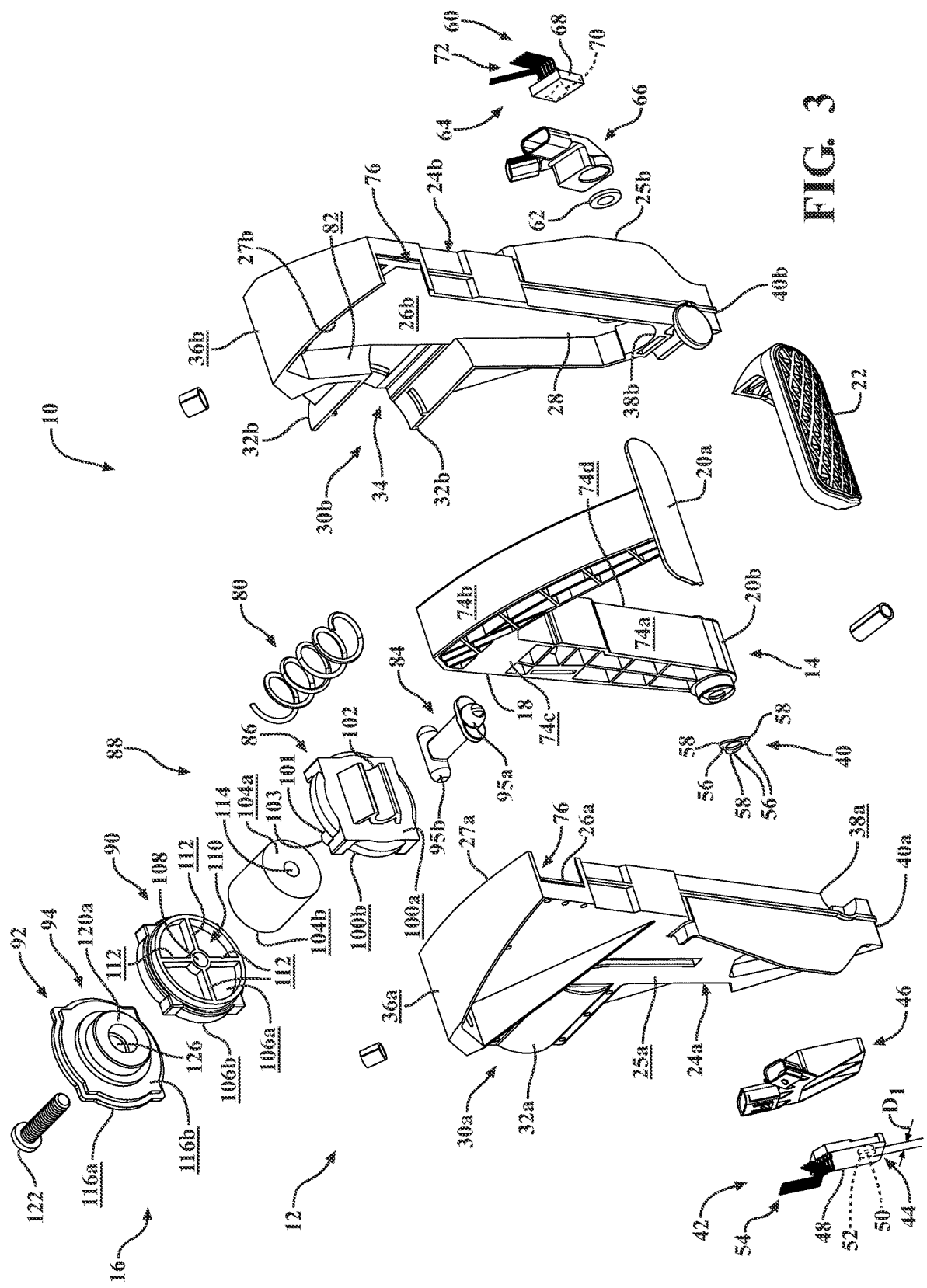
FIG. 3 schematically depicts an exploded perspective view of the pedal assembly of FIG. 1 according to one or more embodiments shown and described herein.

Embodiments described herein are directed to a pedal assembly that includes an emulator assembly and sensors adapted to sense a position and/or force of a pedal pad. The emulator assembly is configured to simulate a braking fluid system, such as a hydraulic system, that is based on a speed system. That is, the faster a driver depresses onto the pedal pad of a pedal, the harder or more difficult the pedal is to depress, known herein as hepatic force.

As a pedal effort (PE) is applied to the pedal, the pedal arm pivots to allow for the pedal to travel. The emulator assembly applies an opposite emulator force (EF) to provide the driver with a resistive force that changes according to the speed in which the PE is applied. Generally, the emulator assembly outputs three distinct force vs travel sections that correspond to a specific range of travel such that the driver feels different resistance or haptics based on how fast the pedal is being depressed.

The emulator assembly includes a housing that is split into two halves and when assembled define a cavity therebetween the two halves. One half includes components for a Hall Effect sensing and the other half includes components for inductive sensing. Further, each half includes an arcuate wall portion that when assembled forms a tubular housing portion. A pedal arm is at least partially received in the cavity. The pedal arm has a pedal pad on one end and a pivot point within the cavity. An elongated member extends and couples to the pedal arm and to the emulator assembly positioned within the tubular housing. The emulator assembly includes a carrier coupled to the elongated member, a first end plate spaced apart from the carrier, a first compressible member positioned in the space between the carrier and the first end plate, and a second end plate spaced apart from the first end plate. The second end plate has a second compressible member extending therefrom into the space between the second end plate and the first end plate. As such, the carrier, the first end plate, and the first compressible member, the second compressible member, and the second end plate are concentrically aligned. The carrier, the first end plate, and the first compressible member, and/or the second compressible member move or compress within the tubular housing along a same axis and the second end plate remains stationary.

When the pedal pad is depressed, the elongated member moves the carrier in a direction towards the first end plate which drives the carrier into the first compressible member such that the first compressible member compresses to generate a force feedback to a foot positioned on the pedal pad. When the first compressible member is fully compressed, the carrier, the first compressible member, and the first end plate compress against the second compressible member to generate a second force feedback onto the foot positioned on the pedal pad. The second force feedback provides a greater hepatic force onto the pedal pad than the hepatic force of the first feedback due to the second compressible member having a stiffness characteristic greater than the first compressible member.

Various embodiments of the pedal assembly and emulator assembly thereof are described in detail herein.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Figure 4:
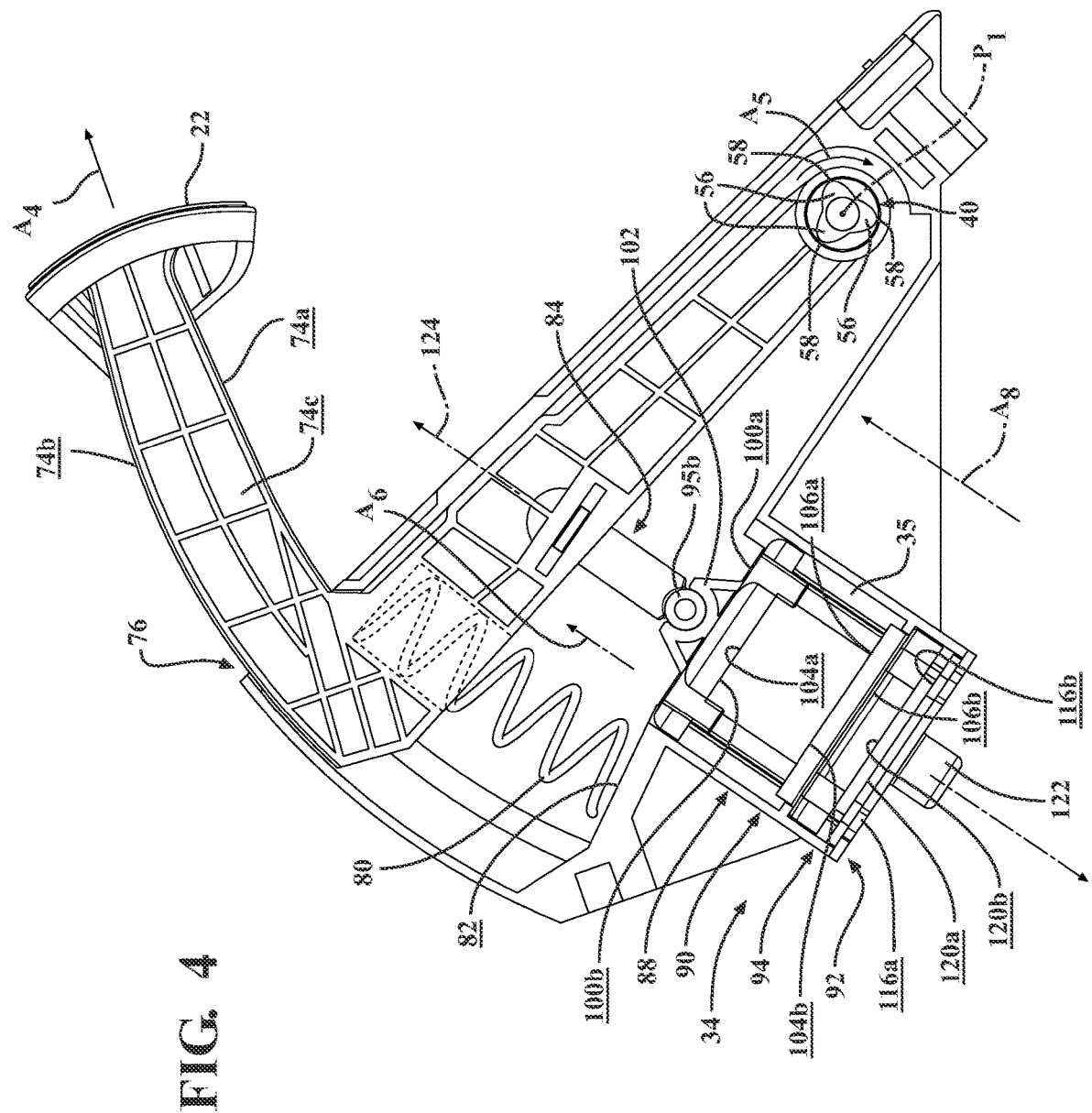
FIG. 4 schematically depicts a cross-sectional view of the pedal assembly of FIG. 1 taken from line 4-4 with a pedal arm in a undepressed state according to one or more embodiments shown and described herein.

Referring initially to FIGS. 1-7, a pedal assembly 10 is schematically depicted. The pedal assembly 10 includes a housing 12, a pedal arm assembly 14, and an emulator assembly 16. The pedal arm assembly 14 includes a pedal arm 18, which includes a pedal pad end 20a and a pivot end 20b. Further, the pedal arm 18 includes a first surface 74a and an opposite second surface 74b and a pair of side surfaces 74c, 74d that define a thickness of the pedal arm 18. In some embodiments, the pedal arm 18 is generally shaped L shaped. In other embodiments, the pedal arm 18 may be differently shaped such as a J or a T. The pivot end 20b is pivotally coupled to the housing 12 about a pivot axis P1, as best illustrated in FIG. 4. The pedal pad end 20a receives a pedal pad 22 that a foot of a user would depress against to brake, accelerate, and/or activate a clutch control. The housing 12 includes an opening 76 that receives portions of the pedal arm 18.

The housing 12 includes a pair of halves 24a, 24b. Each of the pair of halves 24a, 24b has an outer surface 25a, 25b respectively, and an opposite inner surface 26a, 26b, respectively. Each of the pair of halves 24a, 24b has an outer lip 27a, 27b, respectively, or wall that, when assembled together, define a cavity 28 between each inner surface 26a, 26b. The pivot end 20b and a portion of the pedal arm 18 are received within the cavity 28 and moves and/or pivots within the cavity 28, as discussed in greater detail herein. In some embodiments, each of the pair of halves 24a, 24b may further include a wall portion 30a, 30b that may each have corresponding portions 32a, 32b, which are arcuate in shape, such that when the pair of halves 24a, 24b are assembled, a tubular housing portion 34 is formed within the cavity 28 of the housing 12. As such, the tubular housing portion 34 may include a second cavity 35 that is tubular shaped. The second cavity 35 is separate from the cavity 28. In some embodiments, the second cavity 35 may open to the cavity 28. In other embodiments, the wall portion 30a, 30b may each have corresponding portions 32a, 32b shaped other than arcuate. For example, the wall portion 30a, 30b and/or corresponding portions 32a, 32b may be curvilinear, rectangular, square, hexagonal, octagonal, and/or the like. As such, the second cavity 35 may take on various shapes that correspond to the shape of the wall portion 30a, 30b and/or the corresponding portions 32a, 32b.

The tubular housing portion 34 may extend from the housing 12 in the same direction as the depression of the pedal pad 22. For example, the cavity 28 may extend from an upper surface 36a, 36b of each of the pair of halves 24a, 24b of the housing 12 to an opposite lower surface 38a, 38b positioned to terminate before an end portion 40a, 40b of each of the halves 24a, 24b of the housing 12. The second cavity 35 extends within the tubular housing portion 34, which extends rearward from the cavity 28 in the longitudinal direction (i.e., in the front to back direction). As such, in some embodiments, the second cavity 35 may generally extend to be perpendicular to the cavity 28.

Each half of the housing 12 may be a molded plastic. For example, the housing 12 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame retardants, colorants, glass fibers, plasticizers and/or the like.

The housing 12 may be floor mounted. That is, in some embodiments, the housing 12 may be coupled or mounted to be positioned within or extending from a floor surface of a vehicle. As such, the cavity 28 of the housing accommodates the pedal arm 18 at full depression to allow the pedal pad 22 to fully travel.

The first half 24a of the housing 12 includes a first sensing assembly 42 for detecting a movement of a coupler 40 positioned at the pivot end 20b of the pedal arm 18 using inductive sensing technology. In some embodiments, the first sensing assembly 42 includes a printed wiring assembly 44 and a connector housing 46. The printed wiring assembly 44 may include a circuit board 48 (or a printed circuit board), which may include at least one receiver coil 50, a transmitter coil 52, and a plurality of terminal pins 54 extending therefrom. The coupler 40 may be mounted or attached to the pivot end 20b of the pedal arm 18 in the vicinity of and perpendicular to the pivot axis. As such, the coupler 40 may be positioned adjacent to the at least one receiver coil 50. In some embodiments, the coupler 40 may include distinct lobes 56 such as three lobes as illustrated in FIG. 3. This is non-limiting and the coupler 40 may have more or less lobes, be circular, or other shapes, such as a half-moon, square, rectangular, and/or the like. The coupler 40 may rotate or pivot upon movement of the pedal pad 22 of the pedal arm 18. An outermost portion 58 of each lobe 56 may be positioned within an inner diameter D1 of the transmitter coil 52.

The at least one receiver coil 50 and the transmitter coil 52 detect the movements of the coupler 40 and that data is transmitted to an electronic control unit and/or powertrain controller communicatively coupled to the first sensing assembly 42 via the plurality of terminal pins 54 extending within the connector housing 46. Portions of the first sensing assembly 42 may include overmold to encapsulate the electronic components, and it may include solderless connections between the printed wiring assembly 44 and plurality of terminal pins 54, such as compliant through-hole pins.

The second half 24b of the housing 12 includes a second sensing assembly 60 for detecting a movement of a magnet 62 using Hall Effect technology. In some embodiments, the second sensing assembly 60 includes a printed wiring assembly 64 and a connector housing 66. The printed wiring assembly 64 may include a circuit board 68, which may include at least one Hall Effect chip 70 and a plurality of terminal pins 72 extending therefrom. The at least one Hall effect chip 70 is sensitive to a Hall effect detection of magnetic change, and to convert a displacement or angular measurement of a coupler, such as the magnet 62, to an electronic or electromagnetic signal. This information is transmitted through the plurality of terminal pins 72 and to the electronic control unit and/or the powertrain controller for processing.

The magnet 62 may be mounted or attached to the second side surface 74c of the pedal arm 18 at the pivot end 20b in the vicinity of and perpendicular to the pivot axis. As such, the magnet 62 may be positioned adjacent to the at least one Hall Effect chip 70. In some embodiments, the magnet 62 may be generally circular, as illustrated in FIG. 3. In other embodiments, the magnet 62 may be a plurality of other shapes, such as rectangular, square, hexagonal, octagonal, and/or the like. The magnet 62 may rotate or pivot upon movement of the pedal pad 22 of the pedal arm 18.

The at least one Hall effect chip 70 detects the movements of the magnet 62 and that data is transmitted to the electronic control unit and/or powertrain controller communicatively coupled to the second sensing assembly 60 via the plurality of terminal pins 72 extending within the connector housing 66. Portions of the second sensing assembly 60 may include overmold to encapsulate the electronic components, and it may include solderless connections between the printed wiring assembly 64 and plurality of terminal pins 72, such as compliant through-hole pins.

It should be understood that the first sensing assembly 42 and the second sensing assembly 60 simultaneously measure the movement of the pivot end 20b of the pedal arm 18 such that redundant sensing may occur. Further, the redundant sensing described herein uses different sensing techniques which provide for a more robust redundant sensing compared to conventional systems.

Figure 5:
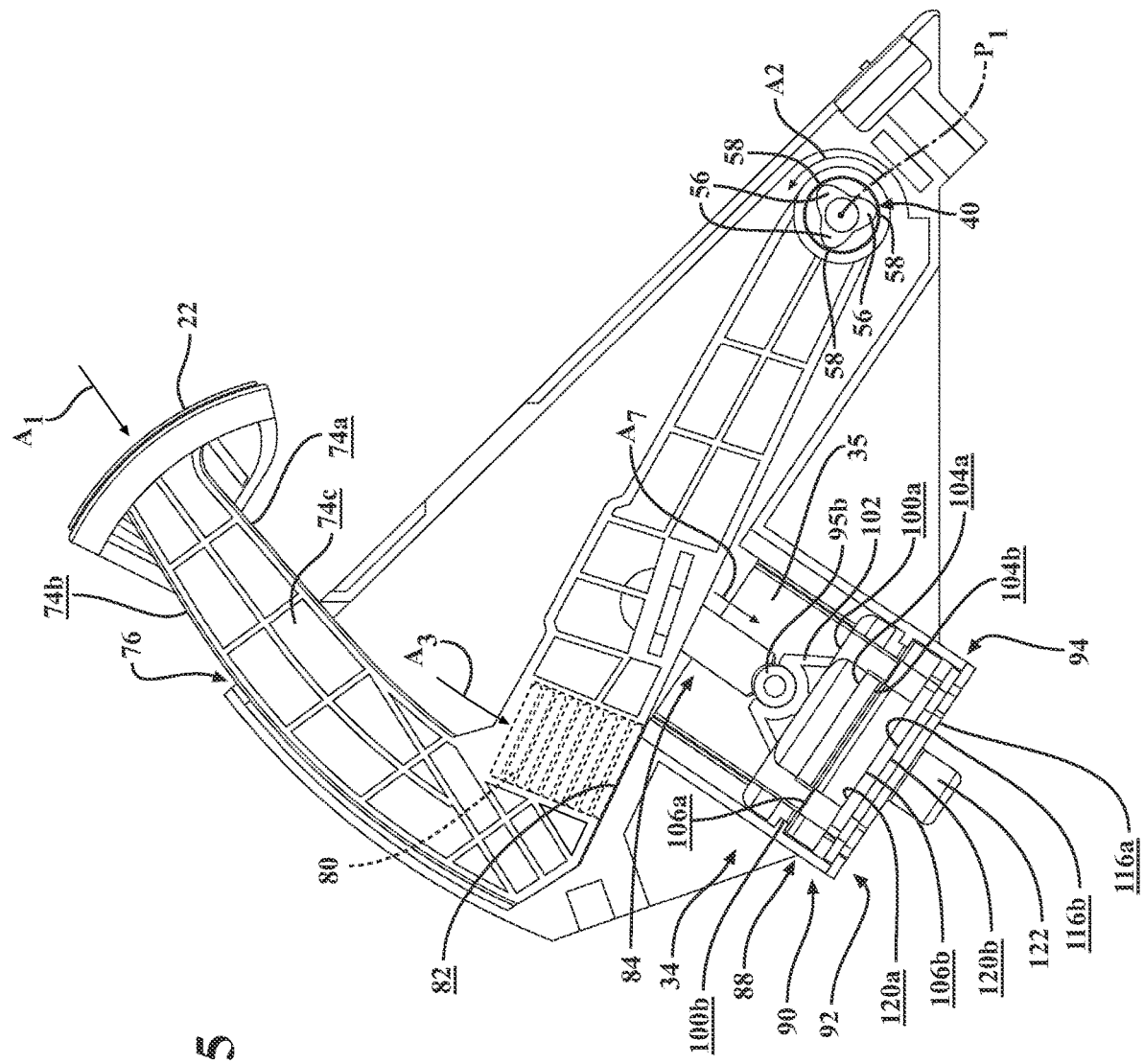
FIG. 5 schematically depicts a cross-sectional view of the pedal assembly of FIG. 1 taken from line 4-4 with the pedal arm in a depressed state according to one or more embodiments shown and described herein.
Figure 6:
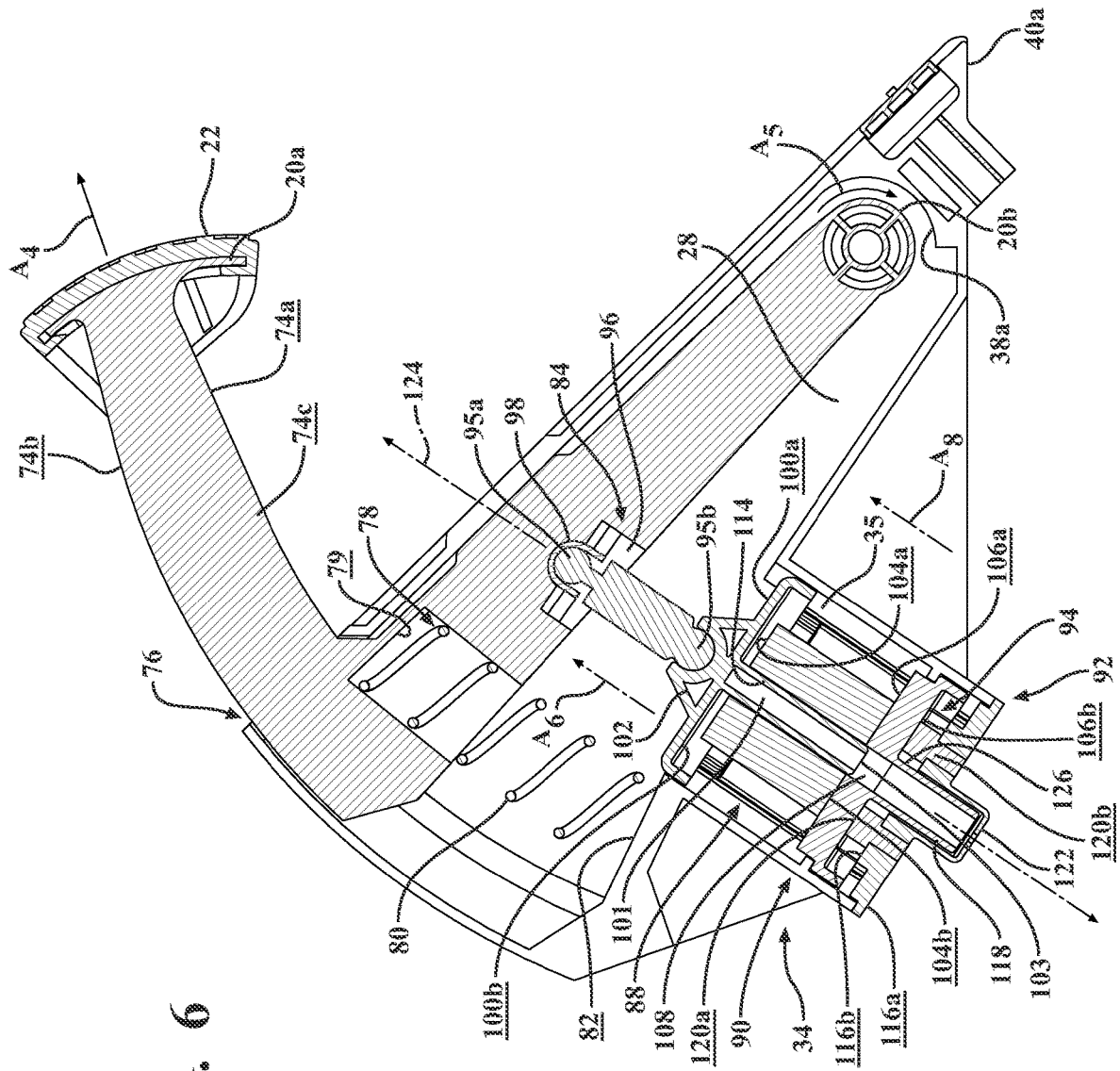
FIG. 6 schematically depicts a second cross-sectional view of the pedal assembly of FIG. 1 taken from line 4-4 with the pedal arm in the undepressed state according to one or more embodiments shown and described herein.
Figure 7:
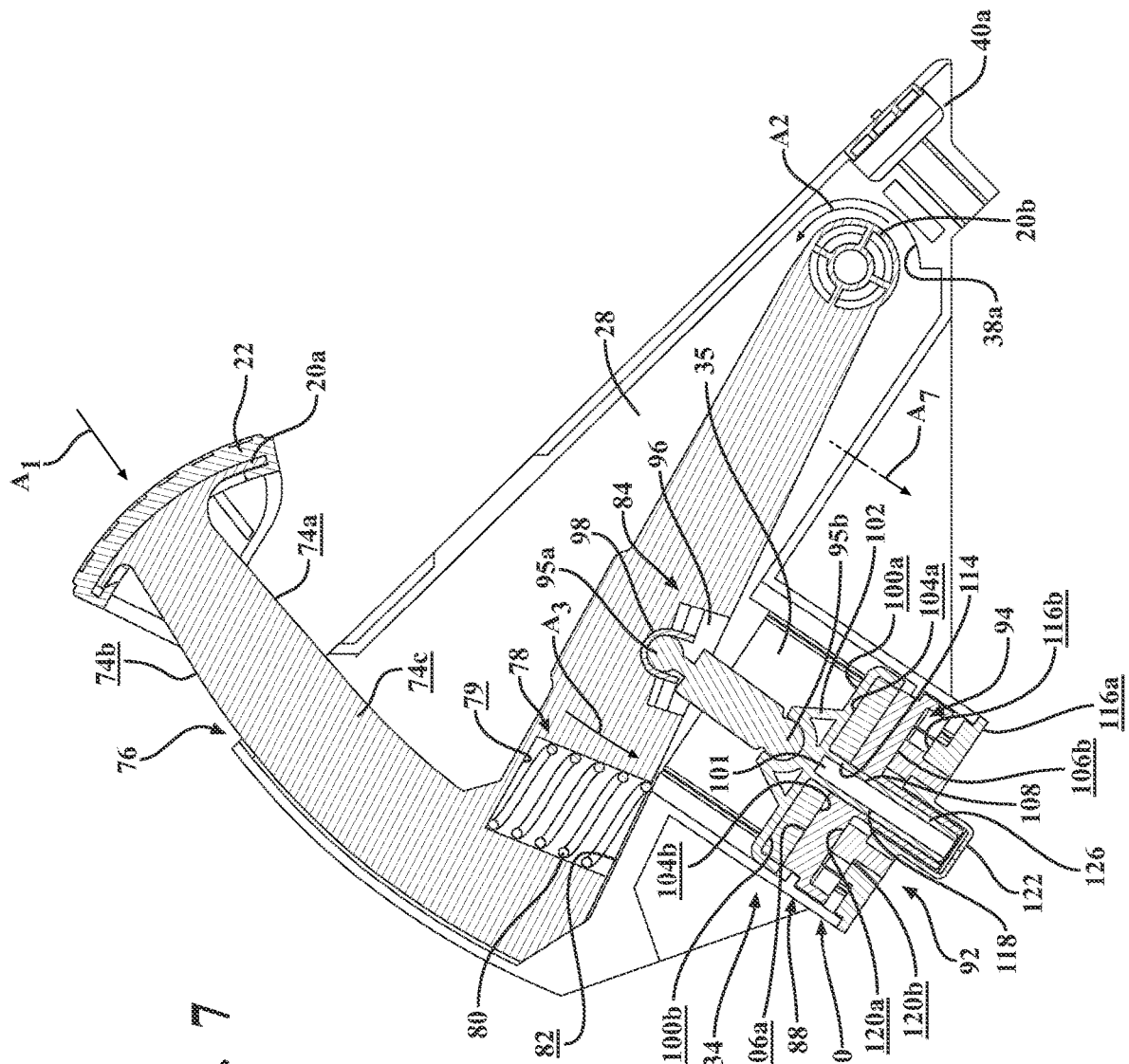
FIG. 7 schematically depicts a second cross-sectional view of the pedal assembly of FIG. 1 taken from line 4-4 with the pedal arm in a depressed state according to one or more embodiments shown and described herein.

Now referring to FIGS. 4-7, the second surface 74b of the pedal arm 18 may include a spring receiving cavity 78 positioned within the cavity 28 of the housing 12. The spring receiving cavity 78 includes a surface 79 that is adapted to receive a spring 80. The spring 80 extends within the cavity 28 of the housing 12 between a spring receiving surface 82 of the outer lip 27a, 27b of each of the pair of halves 24a, 24b of the housing 12 and the spring receiving cavity 78 of the pedal arm 18. The spring 80 provides a resistance and/or a return force on the pedal arm 18. As such, as the pedal pad 22 is depressed in the direction A1, as best illustrated in FIGS. 5 and 7, the pedal arm 18 pivots about the pivot end 20b in the direction A2, as best illustrated in FIGS. 5 and 7, and the spring 80 compresses within the spring receiving cavity 78 due to the force on the pedal pad 22 greater than the energy of the spring 80, as illustrated by arrow A3, as best illustrated in FIGS. 5 and 7.

Once the force on the pedal pad 22 is reduced or eliminated, as best illustrated by arrow A5 illustrated in FIGS. 4 and 6, the energy of the spring 80 (e.g., potential and kinetic) pivots the pedal arm 18 about the pivot end 20b in the direction A5, as best illustrated in FIGS. 4 and 6, and the spring 80 drives the pedal arm 18 through the opening 76 of the housing 12, as illustrated by arrow A6, as best illustrated in FIGS. 4 and 6, to return the pedal arm to its home position or position held by the spring 80 without a force applied on the pedal pad 22.

In some embodiments, the spring 80 may be formed with a steel material. In other embodiments, the spring 80 may be formed with stainless steel, wire, carbon steel, alloy steel, elgiloy, Monel®, copper, nickel, and/or the like.

The pedal arm 18 may be a molded plastic. For example, the pedal arm 18 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame retardants, colorants, glass fibers, plasticizers and/or the like.

In some embodiments, the housing 12 and/or the pedal arm 18 may be formed from injection molding. In other embodiments, the housing 12 and/or the pedal arm 18 may be formed from additive manufacturing techniques. Additive manufacturing techniques refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Now referring back to FIGS. 1-7, the emulator assembly 16 includes an elongated member 84, a carrier 86, a first compressible member 88, a first end plate 90, a second end plate 92, and a second compressible member 94. The elongated member 84 includes a first end 95a and an opposite second end 95b. The pedal arm 18 includes an elongated member receiving cavity 96 and an elongated member receiving coupling 98. The elongated member receiving coupling 98 receives and couples the first end 95a of the elongated member 84 to the pedal arm 18 such that upon movement of the pedal arm 18, the elongated member 84 also moves. In some embodiments, the elongated member receiving coupling 98 receives and couples to the first end 95a of the elongated member 84 via a snap fit configuration. In other embodiments, the elongated member receiving coupling 98 receives and couples to the first end 95a of the elongated member 84 via a fastener, such as a screw, bolt and nut, hook and loop, weld, epoxy, adhesive, and/or the like.

The carrier 86 includes a first surface 100a and an opposite second surface 100b. The first surface 100a faces the pedal arm 18 and includes a second elongated member receiving coupling 102 extending therefrom. The second elongated member receiving coupling 102 receives and couples the second end 95b of the elongated member 84 to the carrier 86 of the emulator assembly 16 such that upon movement of the elongated member 84 the carrier 86 moves within the second cavity 35 of the tubular housing portion 34. In some embodiments, the second elongated member receiving coupling 102 receives and couples to the second end 95b of the elongated member 84 via a snap fit configuration. In other embodiments, the second elongated member receiving coupling 102 receives and couples to the second end 95b of the elongated member 84 via a fastener, such as a screw, bolt and nut, hook and loop, weld, epoxy, adhesive, and/or the like.

The carrier 86 may further include an elongated member 101 extending from the second surface 100b to a terminating end 103. In some embodiments, the terminating end 103 may include internal threads to receive a fastener 122, as discussed in greater detail herein. In other embodiments, the terminating end 103 is free floating and is not coupled to any other component. The elongated member 101 may be in contact with portions of the first compressible member 88, the first end plate 90, the second end plate 92, and the second compressible member 94, as discussed in greater detail herein. The second surface 100b of the carrier 86 and the elongated member 101 may be used to ensure a uniform contact with the first compressible member 88 such that the operation described herein can be repeatable for a plurality of cycles.

The first end plate 90 is positioned within the second cavity 35 of the tubular housing portion 34 and is spaced apart from the carrier 86. The first end plate 90 includes an upper surface 106a and an opposite spaced apart inner surface 106b that define a thickness of the first end plate 90. The upper surface 106a of the first end plate 90 faces the second surface 100b of the carrier 86. As such, the upper surface 106a faces the space between the first end plate 90 and the second surface 100b of the carrier 86. In some embodiments, an aperture 108 extends through the thickness of the first end plate 90 between the upper surface 106a and the inner surface 106b. In some embodiments, the aperture 108 is circular. In other embodiments, the aperture 108 may be any shape such as square, rectangular, hexagonal, octagonal, and/or the like. Further, in other embodiments, the first end plate 90 is solid without the aperture 108. The aperture 108 may receive at least a portion of the elongated member 101 of the carrier 86. That is, at least a portion of the elongated member 101 of the carrier 86 extends within the aperture 108 of the first end plate 90.

A plurality of ribs 110 extend from the upper surface 106a of the first end plate 90. Each of the plurality of ribs 110 extend from the aperture 108 outwardly towards an outer circumference of the first end plate 90. Each of the plurality of ribs 110 include a contact surface 112 that make contact with the first compressible member 88, as discussed in greater detail herein.

The first compressible member 88 is positioned in the space between the first end plate 90 and the carrier 86. In embodiments, the first compressible member 88 is positioned to be in between the upper surface 106a of the first end plate 90 and the second surface 100b of the carrier 86. The first compressible member 88 includes an upper surface 104a spaced apart from an opposite lower surface 104b to define a thickness. The upper surface 104a may be positioned adjacent to and configured to be in contact with the second surface 100b of the carrier 86. The lower surface 104b may be positioned adjacent to and, in configured to be in contact with the contact surface 112 of the plurality of ribs 110 extending from the upper surface 106a of the first end plate 90.

A bore 114 extends through the thickness of the first compressible member 88 from the upper surface 104a to the lower surface 104b. The bore 114 may receive at least a portion of the elongated member 101 of the carrier 86. That is, at least a portion of the elongated member 101 of the carrier 86 extends within the bore 114 of the first compressible member 88. As illustrated, in some embodiments, the first compressible member 88 is tubular shaped to match the shape of the second cavity 35 of the tubular housing portion 34 and the shape of the carrier 86 and the first end plate 90. However, this is non-limiting, and the first compressible member 88 may be any shape, such as rectangular, square, hexagonal, octagonal, and/or the like.

Figure 8:
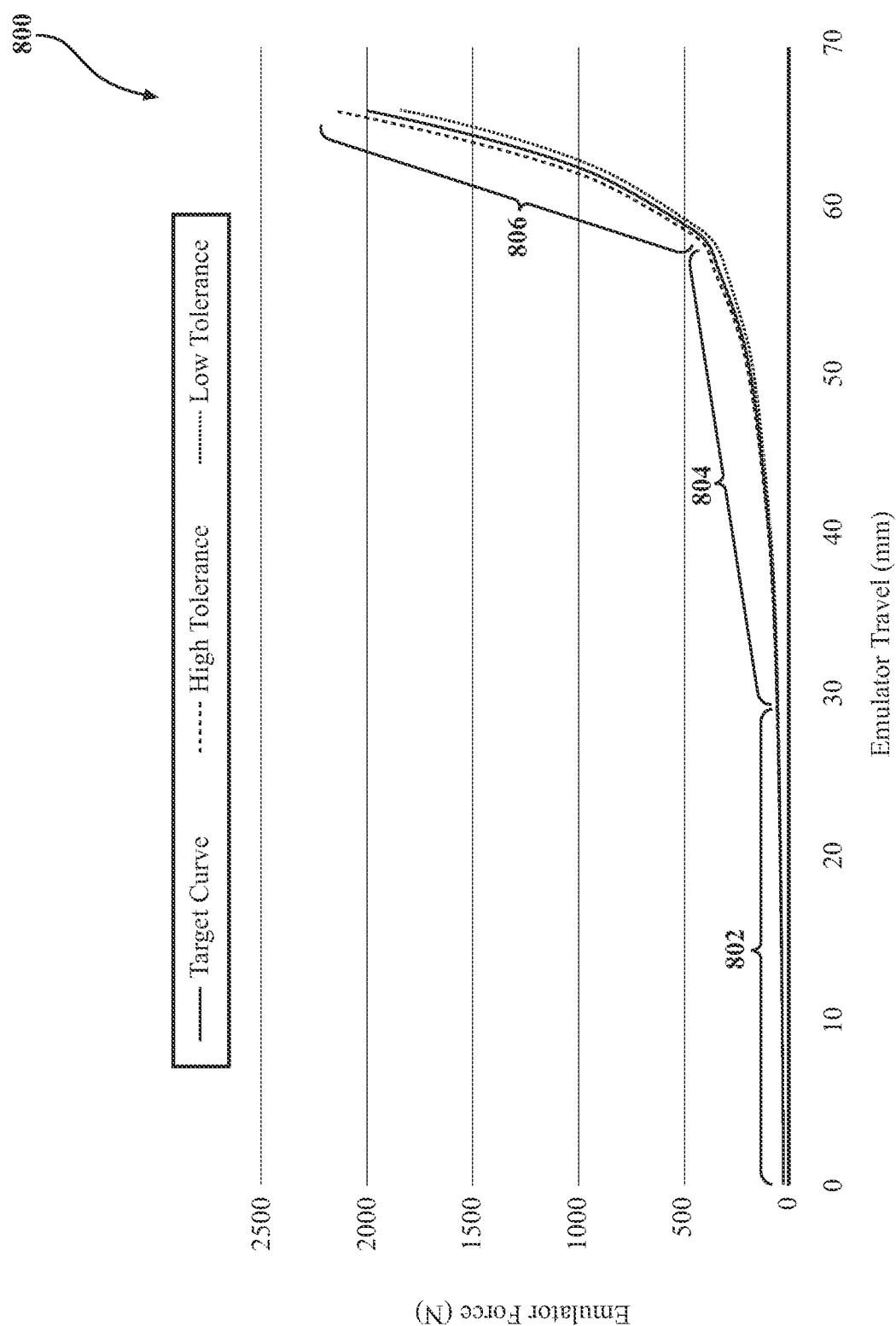
FIG. 8 schematically illustrates a graphical representation of a base speed force vs travel curve according to one or more embodiments shown and described herein.

The first compressible member 88 is configured to move or compress between an uncompressed state, as best illustrated in FIGS. 4 and 6, to a compressed state, as best illustrated in FIGS. 5 and 7, based on the amount of depression of the pedal pad 22. In the compressed state, the upper surface 104*a* is compressed to be positioned closer to the lower surface 104*b* than in the uncompressed state. Further, in the compressed state, the first compressible member 88 is made of a material that permits compression at 80-85 percent compared to first compressible member 88 in the uncompressed state. That is, when fully compressed, the first compressible member 88 is compressed to 80-85 percent of its original uncompressed state. As such, the first compressible member 88 is resilient and moves between the uncompressed state and the compressed state as a function of the amount of force applied to the pedal pad 22. It should be understood that there is a plurality of semi-compressed states between the uncompressed state and the compressed state and each of these semi-compressed states produce a different stiffness characteristic based on the density and compression of the first compressible member 88, as best illustrated in FIG. 8. As such, the compression of the first compressible member 88 produces a gradual increase in slope compared to the sharp increase produced by the second compressible member 94 sharply increases, as best illustrated in FIG. 8, and as discussed in greater detail herein.

The first compressible member 88 may be a microcellular foam. In some embodiments, the microcellular foam may be a microcellular silicone foam. In other embodiments, the microcellular foam may be a polyurethane foam. Further, the microcellular foam may have a density range of 100 kilogram per cubic meter ($kg/m^3$) to 600 $kg/m^3$. In some embodiments illustrated herein, the density range of the microcellular foam of the first compressible member 88 may be 200 $kg/m^3$ to 500 $kg/m^3$.

The second end plate 92 is spaced apart from the first end plate 90. The second end plate 92 includes an exterior surface 116*a* and an opposite spaced apart interior surface 116*b* define a thickness. The second end plate 92 closes the second cavity 35 of the tubular housing portion 34 such that the exterior surface 116*a* is exposed and the interior surface 116*b* is positioned within the second cavity 35. The interior surface 116*b* of the second end plate 92 faces the inner surface 106*b* of the first end plate 90. As such, the interior surface 116*b* faces the space between the inner surface 106*b* of the first end plate 90 and the second end plate 92. In some embodiments, an aperture 118 extends through the thickness of the second end plate 92 between the interior surface 116*b* and the exterior surface 116*a*. In some embodiments, the aperture 118 is circular. In other embodiments, the aperture 118 may be any shape such as square, rectangular, hexagonal, octagonal, and/or the like. Further, in other embodiments, the second end plate 92 is solid without the aperture 118.

In some embodiments, the fastener 122 and/or a portion of the elongated member 101 of the carrier 86 may be received in the aperture 118. That is, at least a portion of the elongated member 101 of the carrier 86 and/or the fastener 122 may extend within the aperture 118 of the second end plate 92. The fastener may be positioned exterior to the second cavity 35 and extend into the second cavity 35 though the aperture 118. In some embodiments, the fastener 122 threadably engages with the terminating end 103 of the elongated member 101 of the carrier 86 to maintain a coaxial alignment of the carrier 86, the first compressible member 88, the first end plate 90, the second end plate 92, and the second compressible member 94 within the second cavity 35 of the tubular housing portion 34 along an axis 124, as best illustrated in FIGS. 4 and 6.

The second compressible member 94 is positioned to extend from the interior surface 116*b* into the space between the first end plate 90 and the second end plate 92. As such, the second compressible member 94 includes a first surface 120*a* and an opposite second surface 120*b* that defines a thickness of the second compressible member 94. The second surface 120*b* may be in contact with and extending from the interior surface 116*b* of the second end plate 92 into the space between the first end plate 90 and the second end plate 92.

In some embodiments, an aperture 126 extends through the thickness of the second compressible member 94 between the first surface 120*a* and the second surface 120*b*. In some embodiments, the aperture 126 is circular. In other embodiments, the aperture 126 may be any shape such as square, rectangular, hexagonal, octagonal, and/or the like. Further, in other embodiments, the second compressible member 94 is solid without the aperture 126. In some embodiments, the second compressible member 94 may be an elastomer material such as a cured silicone rubber that may be applied as a liquid via a one-shot injection molding or other known methods to form any shape desired. In other embodiments, the second compressible member 94 may be a silicone rubber, natural rubber, or other elastomeric material that is formed using compression and other techniques and that is suitable for repetitive compression over millions of cycles and has temperature performance desired in pedal assembly applications. In embodiments, the elastomer material of the second compressible member 94 may have a stiffness characteristic of at least 100 newton-millimeters (N/mm) spring rate in an uncompressed state, or starting state. In some embodiments illustrated herein, the second compressible member 94 may have a stiffness characteristic of at least 150 newton-millimeters (N/mm) spring rate in an uncompressed state, or starting state. As the second compressible member 94 is compressed from pressure applied by the first end plate 90, the stiffness characteristic of the second compressible member 94 sharply increases until a full compressed state, as best illustrated in FIG. 8.

The second end plate 92 is stationary, or coupled in place. As such, while the elongated member 84 moves the carrier 86, the first compressible member 88, and the first end plate 90 along axis 124 within the second cavity 35 of the tubular housing portion 34, the second end plate 92 remains in place and provides an end wall or bottom support of the emulator assembly 16.

In operation, when the pedal pad 22 is depressed in the direction illustrated by arrow A1 in FIGS. 5 and 7, the elongated member 84 moves the carrier 86 in a direction towards the first end plate 90, in the direction illustrated by arrow A7 in FIGS. 5 and 7. The movement of the carrier 86 into the first compressible member 88 compresses the first compressible member 88 to generate a force feedback to a foot on the pedal pad 22. When the first compressible member 88 is fully compressed (e.g., 80-85 percent compression), the carrier 86, the first compressible member 88, and the first end plate 90 are moved along axis 124 in the direction of arrow A7, as best illustrated in FIGS. 5 and 7 then compress against the second compressible member 94 to generate a second force feedback onto the foot on the pedal pad 22. The second force feedback is greater emulator force, or hepatic force, than the emulator force, or hepatic force, of the first feedback, as discussed in greater detail with respect to FIG. 8. The greater hepatic force is due to the second compressible member stiffness characteristic greater than the first compressible member.

When the force applied to the pedal pad 22 is reduced or eliminated in the direction illustrated by arrow A4 in FIGS. 4 and 6, the resiliency of the first compressible member 88 moves the elongated member 84 and the carrier 86 in a direction away from the first end plate 90 illustrated by arrow A8 in FIGS. 4 and 6. As such, the first compressible member 88 decompresses to move the elongated member 84 illustrated by arrow A8 in FIGS. 4 and 6 and pivot the pedal arm 18 about the pivot end 20b illustrated by arrow A5 in FIGS. 4 and 6. Such movement reduces the force feedback felt back the foot on the pedal pad 22. Further, the second compressible member 94 decompresses as the first end plate 90 is removed from applying a force on the second compressible member 94, and the second end plate 92, which is stationary, because the first compressible member 88 is no longer fully compressed. As such, during depression and return of the pedal pad, the first compressible member 88, the carrier 86 and the first end plate move within the second cavity 35 of the tubular housing portion 34 along axis 124 in the direction of arrow A7, as best illustrated in FIGS. 5 and 7 or in the direction of arrow A8, as best illustrated in FIGS. 4 and 6, dependent on the pressure applied to the pedal pad 22.

Now referring to FIG. 8 and still referring to FIGS. 4-7, a graphical representation of the different pedal effort forces based on an amount of depression of the pedal pad 22 is schematically depicted. That is, the emulator assembly 16 has three distinct force vs travel sections as graphically illustrated along a base speed force vs travel curve. As illustrated, three distinct forces that correspond to a specific range of travel such that the driver feels different resistance or haptics based on how fast the pedal pad 22 is being depressed. In the first section, illustrated by bracket 802, is when the pedal arm 18 is depressed, but there is not much force applied by the carrier 86 onto the first compressible member 88 (e.g., a normal braking curve).

The second section, illustrated by bracket 804, is when the first compressible member 88 is being compressed within the second cavity 35 of the tubular housing portion 34 against the first end plate 90 with the first compressible member 88 fully compressed (80-85 percent of its original size is compressed) at the 60 millimeters of travel. This is the transitioning to the pedal hardening curve. As illustrated, the first compressible member 88 may generally move from an uncompressed state to a full compressed state between the 30-60 millimeters of travel with the plurality of semi-compressed states therebetween. As illustrated, the curve is a slight upward slope. As such, the more travel of the emulator the greater the emulator force acts on the pedal pad 22 such the foot of the user feels the haptics. At the 60 millimeters travel, the curve is in the pedal hardening stage, illustrated by bracket 806. At this stage, the first compressible member 88 may be fully compressed and the first end plate is gradually applying more force onto the second compressible member 94. Because the second compressible member 94 has harder deformable characteristics compared to the first compressible member 88 (i.e., more difficult to compress or deform), the emulator force felt at the pedal pad 22 significantly increases during the travel of the emulator assembly 16. As such, the last 10 millimeters of travel produces the greatest increase in emulator force, as illustrated in FIG. 8.

Figure 9:
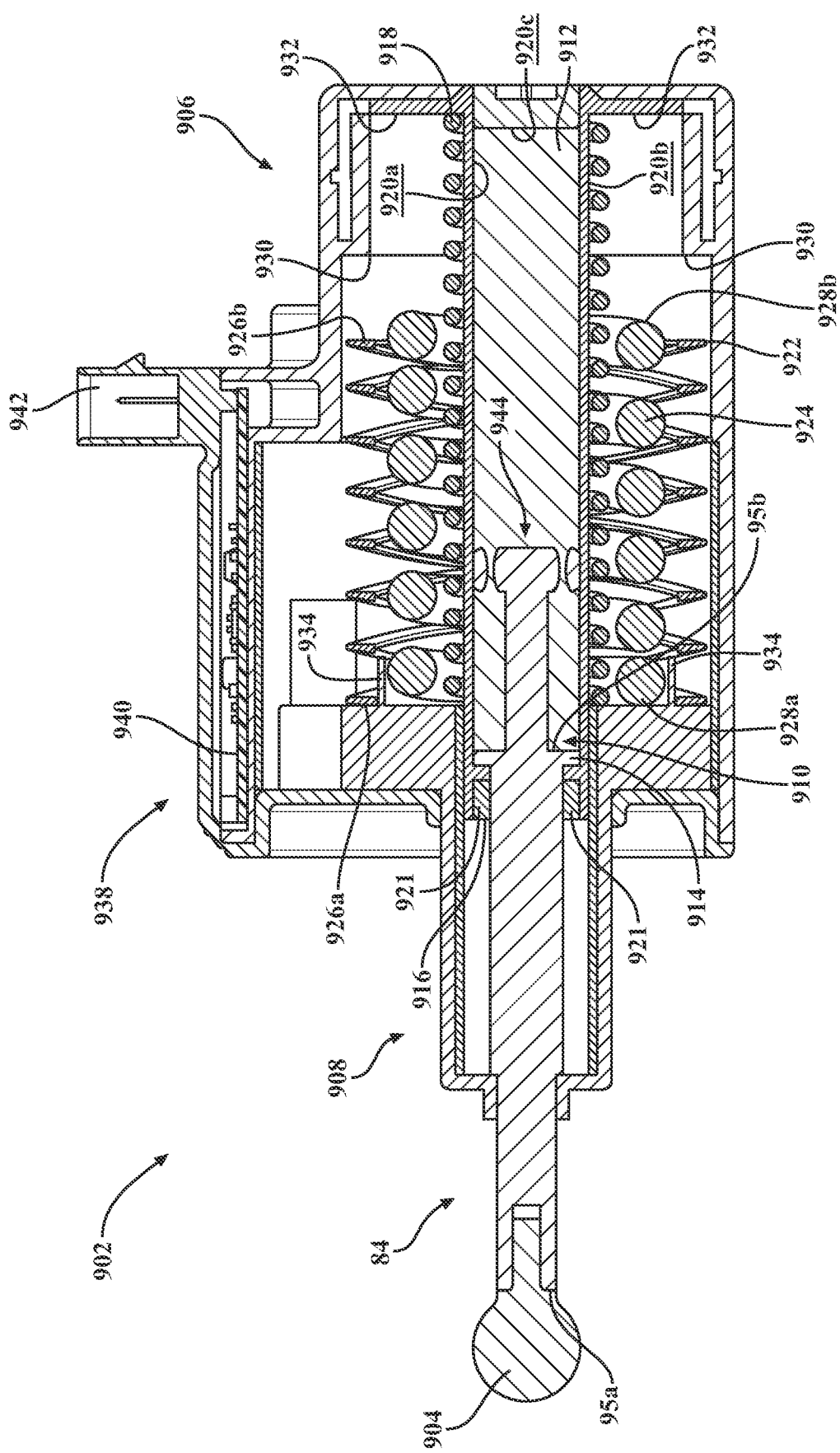
FIG. 9 schematically depicts a cross-sectional view of a second aspect emulator assembly that utilizes springs for hysteresis and fluid as a damper according to one or more embodiments shown and described herein.

Alternative aspects of the emulator assembly:

FIG. 9 schematically depicts a cross-sectional view of a second aspect emulator assembly 902. The emulator assembly 902 is positioned within the cavity 28 of the housing 12 as described above. Further, the emulator assembly 902 includes the elongated member 84 with the first end 95a coupled to the pedal arm 18 and the second end 95b coupled to the emulator assembly 902, as described herein. The first end 95a is configured with a universal end 904 adapted to be coupled to multiple pedal arm 18 arrangements.

The emulator assembly 902 utilizes a three-spring concept to generate the basic and distinct force curves as illustrated in FIG. 8. Further, each of these three-spring embodiments, utilize a different method to create a rate dependent damping force and an inherent hysteresis associated with each. Further, the emulator assembly 902 utilizes a fluid for damping, as described in greater detail herein.

The emulator assembly 902 includes a housing 906 and an actuator 908 positioned within the housing 906. The housing 906 may be overmolded. The elongated member 84 moves between a plurality of positions. The second end 95b of the elongated member 84 is positioned within a chamber 910 of the actuator 908. The chamber 910 is configured with an inner surface 920a and an opposite outer surface 920b and an end wall 920c. The inner surface 920a, the end wall 920c and a shaft seal 921 contain a fluid 912, such as silicone, and the second end 95b within the chamber 910 for damping. Further, the elongated member 84 includes an upstop face 914 that is positioned between the first end 95a and the second end 95b and is positioned within the chamber 910 of the actuator 908. Additionally, the elongated member 84 includes an opposite downstop face 916 that is positioned between the first end 95a and the upstop face 914 and is positioned external to the chamber 910 of the actuator 908.

A first compression spring 918 circumferentially surrounds the chamber 910 and may be in contact with an outer surface 920b of the chamber 910. A wave spring 922 and a second compression spring 924 then circumferentially surround the chamber 910 and the first compression spring 918. As such, the second compression spring 924 has a greater diameter and circumference than the first compression spring 918. Each of the wave spring 922 and the second compression spring 924 have a connection end 926a, 928a and an opposite contact end 926b, 928b, respectively. The contact end 926b, 928b of the wave spring 922 and second compression spring 924 is configured to make contact or engage with a respective wave actuation face 930 for the wave spring 922 and compression actuation face 932 for the second compression spring 924 of the actuator 908 within the housing 906.

The connection end 926a of the wave spring 922 may be attached or coupled to an actuator attachment portion 934 that extends within the housing 906. The connection end 928a of the second compression spring 924 may also be attached or coupled to the actuator attachment portion 934 that extends within the housing 906. In some embodiments, the first compression spring 918, the wave spring 922 and the second compression spring 924 may have different spring constants. In other embodiments, the first compression spring 918, the wave spring 922 and the second compression spring 924 may have the same spring constants.

The housing 906 may include a sensor assembly 938. The sensor assembly 938 may include a printed circuit board 940 and a connector 942. As such, in some embodiments, the printed circuit board 940 may include at least one Hall Effect chip and a magnet may be positioned on the elongated member 84, the springs 918, 922, 924, or anywhere within the housing 906 that moves to detect said movement via Hall Effect sensing techniques. In other embodiments, the printed circuit board 940 may include a transmitter coil and at least one receiving coil to inductively sense a coupler that may be formed as part of the second end 95b of the elongated member 84 or elsewhere within the housing 906 on components that move based on pedal pad 22 (FIG. 1) depression to detect said movement of the coupler using inductive sensing techniques.

In operation, when the pedal pad 22 (FIG. 1) is depressed by foot, the elongated member 84 of emulator assembly 902 is actuated linearly, in which the actuator 908 moves with the elongated member into the chamber 910 to begin to compress the first compression spring 918. This is the first section, illustrated by bracket 802, in FIG. 8. The elongated member 84 and the actuator 908 travel a predetermined distance until the wave spring 922 reaches the wave actuation face 930 in the housing 906 and begins to compress. This is the second section, illustrated by bracket 804, in FIG. 8. The elongated member 84 and the actuator 908 continue to travel until the second compression spring 924 reaches the compression actuation face 932, where it continues to travel for the duration of the distance permitted by the length of the cavity 910. This is the third section, illustrated by bracket 806, in FIG. 8. To return, the pressure on the pedal pad 22 is released and the energy of the springs 918, 922, 924 returns the elongated member 84, the actuator 908, and the pedal arm 18 to idle or install position.

Further, when the pedal pad 22 is depressed, along with the mechanics of the springs 918, 922, 924, the fluid 912 acts as damper for the apply and return strokes of the elongated member 84. The elongated member 84 includes an integrated piston with orifice shapes 944 to allow the fluid 912 to pass through as the elongated member 84 is actuated. As such, because the fluid 912 is viscous, a damping resistance is created and is increased the faster the actuation of the elongated member 84 as a result of pressure on the pedal pad 22. This provides the desired rate dependent force curves. Further, on the return stroke, the fluid 912 gives resistance to return or hysteresis. It should be appreciated that the fluid 912 is non-limiting and other viscous or non-viscous fluids may be used.

Figure 10:
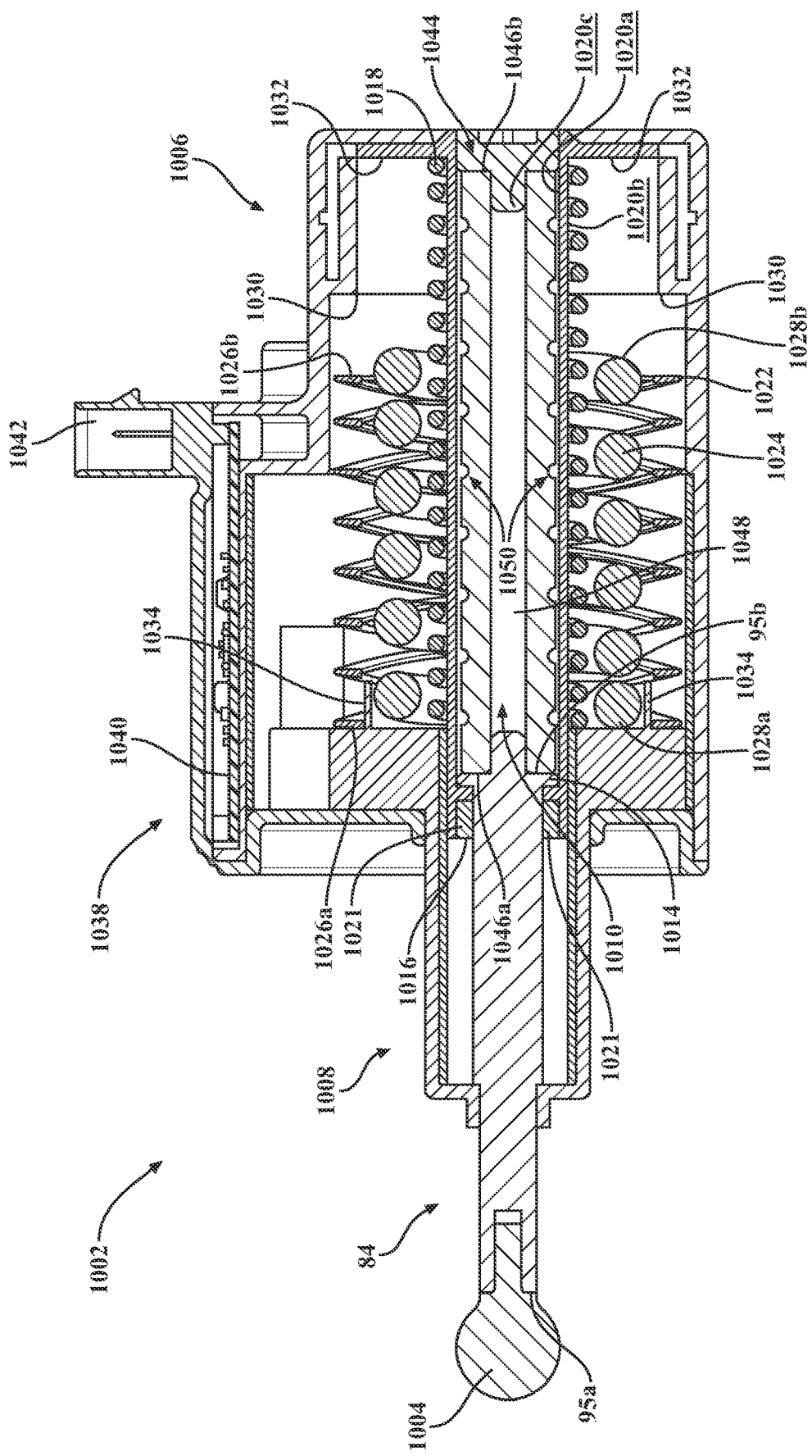
FIG. 10 schematically depicts a cross-sectional view of a third aspect emulator assembly that utilizes springs for hysteresis and a viscoelastic silicone as a damper according to one or more embodiments shown and described herein.

Now referring to FIG. 10, a third aspect of an emulator assembly 1002 is schematically depicted. It is understood that the emulator assembly 1002 is similar to the emulator assembly 902 with the exceptions of the features described herein. As such, like features will use the same reference numerals only referred to as a "10". As such, for brevity reasons, these features will not be described again.

The emulator assembly 1002 utilizes a three-spring concept to generate the basic and distinct force curves as illustrated in FIG. 8. Further, each of these three-spring embodiments, utilize a different method to create a rate dependent damping force and an inherent hysteresis associated with each. Further, the emulator assembly 1002 utilizes a viscoelastic silicone for damping, as described in greater detail herein.

The viscoelastic material 1044 includes a first end 1046a and an opposite second end 1046b. The viscoelastic material 1044 is positioned within the chamber 1010 and is a coupled to the housing 1006 or chamber 1010 at both the first and second ends 1046a, 1046b. Further, the viscoelastic material 1044 includes an elongated bore 1048 that receives the second end 95b of the elongated member 84. Further, the viscoelastic material 1044 includes a plurality of cutouts 1050. In some embodiments, each of the plurality of cutouts 1050 are uniformly spaced apart at predetermined intervals. In other embodiments, each of the plurality of cutouts 1050 may be non-uniformly spaced apart and positioned at uneven intervals. In some embodiments, each of the plurality of cutouts 1050 may be u-shaped. In other embodiments, each of the plurality of cutouts 1050 may be v-shaped, or some other shape, or may be combinations of u-shape, v-shape and/or other shapes.

It should be understood that the viscoelastic material 1044, although in a solid form, may have the same rate dependent characteristics when compressed as the fluid 912 as discussed above with reference to FIG. 9. Further, on the return of the elongated member 84, the hysteresis is achieved by the springs 1018, 1022, 1024 forcing the compressed shape of the viscoelastic material 1044 back to its original form because the viscoelastic material 1044 is attached to a fixed position (e.g., the chamber 1010 and/or the housing 1006).

In operation, when the pedal pad 22 (FIG. 1) is depressed, along with the mechanics of the springs 1018, 1022, 1024, the viscoelastic material 1044 acts as damper for the apply and return strokes of the elongated member 84. As such, because the viscoelastic material 1044 is compressible and resilient to return to its original form, a damping resistance is created and is increased the faster the actuation of the elongated member 84 as a result of pressure on the pedal pad 22 (FIG. 1). This provides the desired rate dependent force curves. Further, the plurality of cutouts 1050 may influence the desired rate dependent force curves. For example, the number of the plurality of cutouts 1050, the spacing between the plurality of cutouts 1050, the size of each of the plurality of cutouts 1050, and/or the like, affect the desired rate dependent force curves on the given damping, resistance to return or hysteresis.

Figure 11:
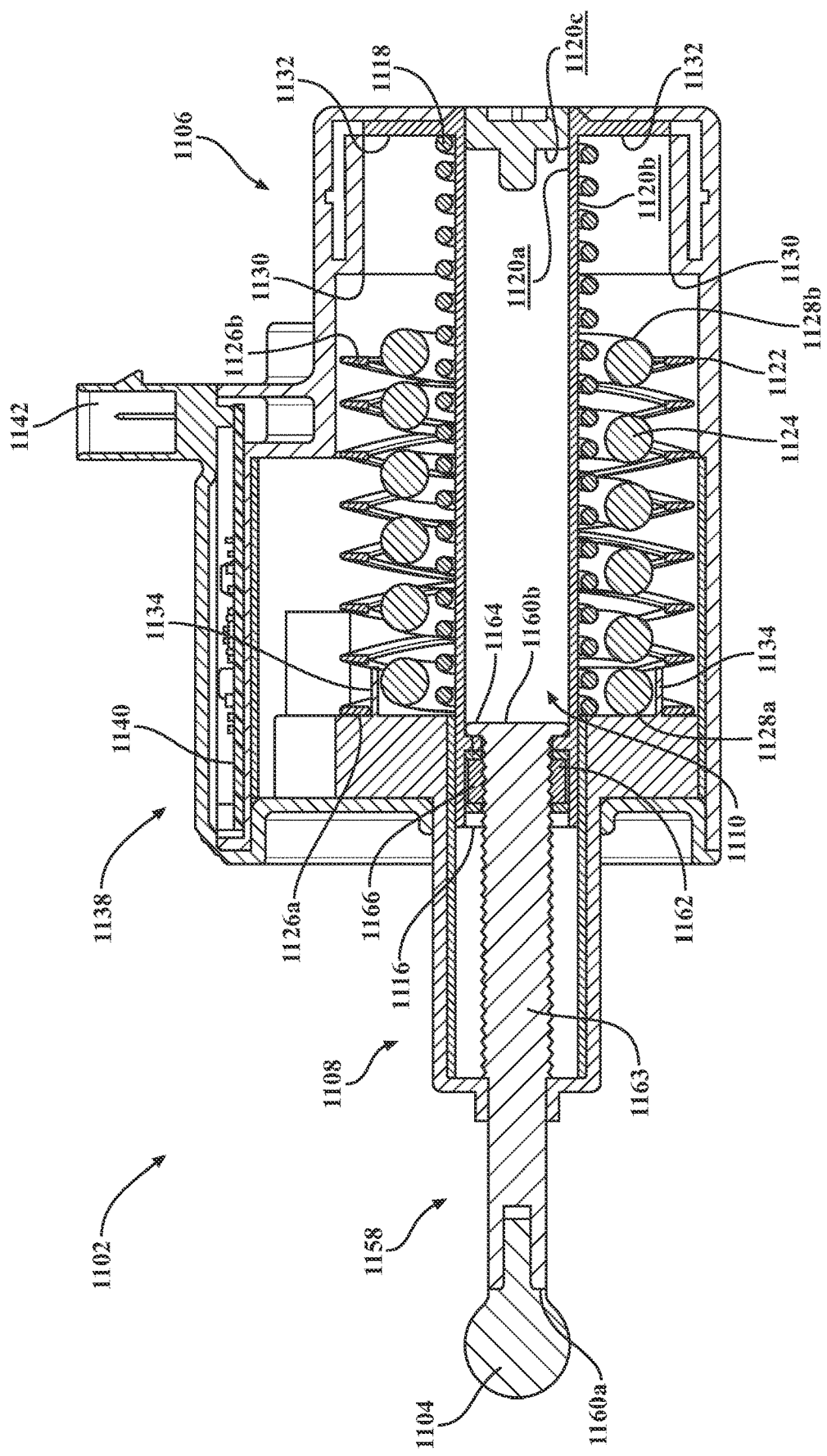
FIG. 11 schematically depicts a cross-sectional view of a fourth aspect emulator assembly that utilizes springs for hysteresis and a back driving lead screw as a damper according to one or more embodiments shown and described herein.

Now referring to FIG. 11, a fourth aspect of an emulator assembly 1102 is schematically depicted. It is understood that the emulator assembly 1102 is similar to the emulator assembly 902 with the exceptions of the features described herein. As such, like features will use the same reference numerals only referred to as an "11". As such, for brevity reasons, these features will not be described again.

The emulator assembly 1102 utilizes a three-spring concept to generate the basic and distinct force curves as illustrated in FIG. 8. Further, each of these three-spring embodiments, utilize a different method to create a rate dependent damping force and an inherent hysteresis associated with each. Further, the emulator assembly 1102 utilizes a leadscrew for damping, as described in greater detail herein.

The elongated member 84 is replaced with a leadscrew 1158, which includes a first end 1160a and an opposite second end 1160b. A nut 1162 is positioned adjacent to the chamber 1110. The leadscrew 1158 include a plurality of external treads 1163 extending up the shaft of the leadscrew 1158. A rotational bushing 1164 and a pair of thrust washers 1166 are positioned near the second end 1160b. The leadscrew 1158 and nut 1162 may be back driven via an actuator or motor to achieve the rate dependent travel curves and hysteresis by way of friction, pressure and velocity. In this embodiment, the leadscrew 1158 is actuated linearly and constrained rotationally while the nut 1162 is free to rotate. As the leadscrew linear speed is increased the pressure/velocity factor of the lead angle of the threads create friction and different forces to push the leadscrew 1158.

Figure 12:
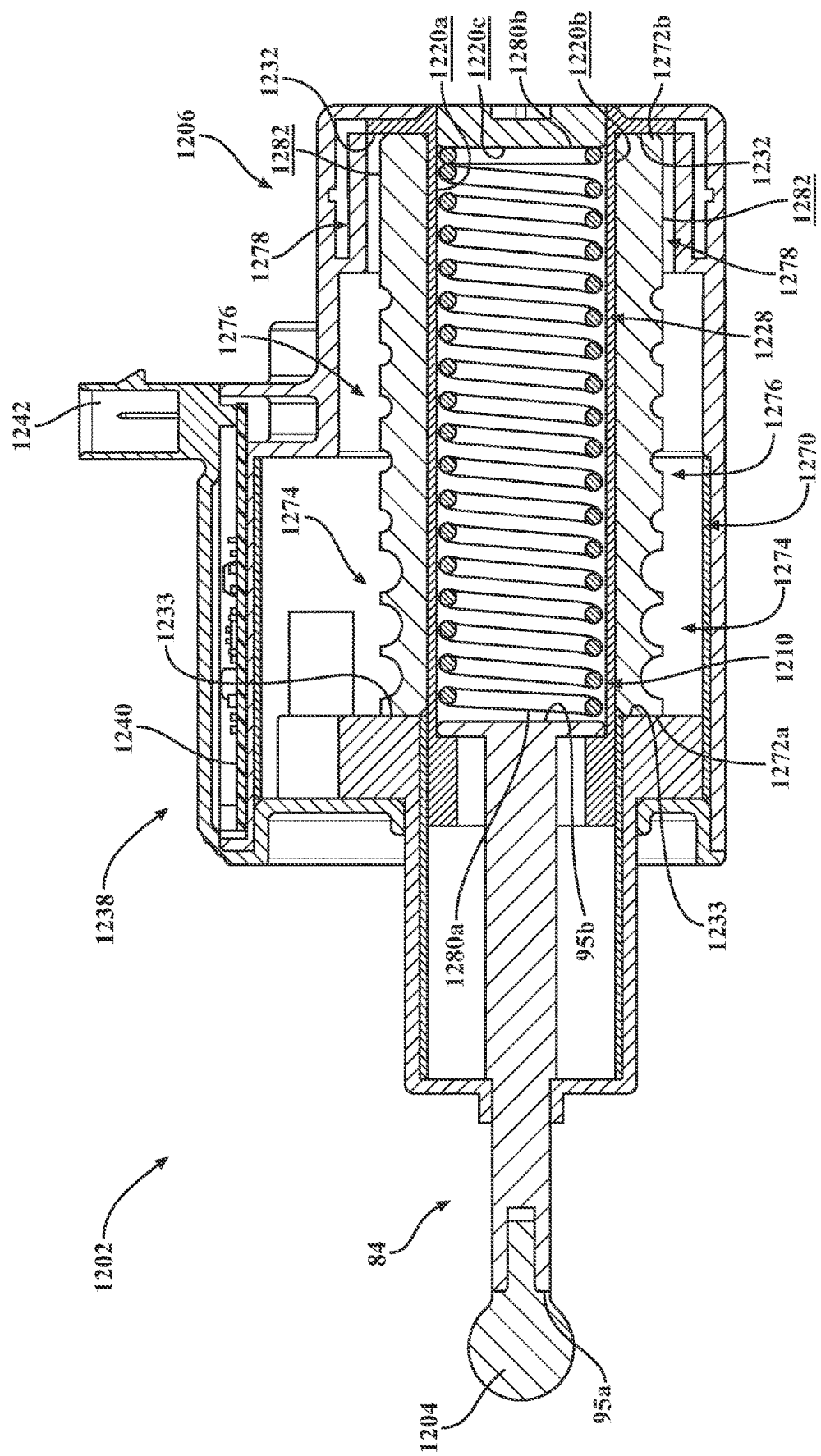
FIG. 12 schematically depicts a cross-sectional view of a fifth aspect emulator assembly that utilizes springs for hysteresis and a viscoelastic as a damper according to one or more embodiments shown and described herein.

Now referring to FIG. 12, a fifth aspect of an emulator assembly 1202 is schematically depicted. It is understood that the emulator assembly 1202 is similar to the emulator assembly 902 with the exceptions of the features described herein. As such, like features will use the same reference numerals only referred to as a "12". As such, for brevity reasons, these features will not be described again.

The emulator assembly 1202 utilizes a viscoelastic material 1270 for damping. The viscoelastic material 1270 includes a first end 1272*a* and an opposite second end 1272*b*. The viscoelastic material 1270 is positioned within the housing 1206 and is exterior to the chamber 1210. The viscoelastic material 1270 may circumferentially surround the chamber 1210. The viscoelastic material 1270 is coupled to the housing 1206 at both the first and second ends 1272*a*, 1272*b*. In some embodiments, the second end 1272*b* of the viscoelastic material 1270 is coupled to the compression actuation face 1232 while the first end 1272*a* is coupled to the compression actuation face 1233.

Further, the viscoelastic material 1270 includes three segments 1274, 1276, 1278 or portions. Each of the segments 1274, 1276, 1278 include a different structure that affects the speed curve. For example, the first segment 1274 includes the largest cutouts and are uniformly spaced apart at predetermined intervals. The middle segment 1276 includes the smallest cutouts and are uniformly spaced apart at predetermined intervals. The third segment 1278 does include cutouts and instead has a planar surface 1282. It should be appreciated that this is non-limiting and the cutout sizes, spacing, and/or the like may vary to change the force feedback (hepatic feedback and/or hysteresis). A compression spring 1228 may be positioned within the chamber 1210. The compression spring 1228 includes a first end 1280*a* and an opposite second end 1280*b*. The first end 1280*a* is in communication with the second end 95*b* of the elongated member 84 while the second end 1280*b* is in communication with the end wall 1220*c* of the chamber 1210.

When the driver depresses the pedal pad 22 (FIG. 1), the elongated member 84 begins to travel linearly in the chamber 1210. The viscoelastic material 1270 begins to compress and due to its shape and custom formulation, all 3 curves of FIG. 8 are met with damping and hysteresis characteristics inherent in the material. The compression spring 1228 ensures the pedal pad returns and determines hysteresis all in the emulator assembly 1206.

It should now be understood that the embodiments described herein are directed to a pedal assembly that includes an emulator assembly and sensors adapted to sense a position and/or force of a pedal pad. The emulator assembly is configured to simulate a braking fluid system, such as a hydraulic system, that is based on a speed system such as the faster a driver depresses onto the pedal pad of a pedal, the harder or more difficult the pedal is to depress, known herein as hepatic force. The emulator assemblies described herein applies an opposite emulator force (EF) to provide the driver with a resistive force that changes according to the speed in which the PE is applied. Generally, the emulator assembly outputs three distinct force vs travel sections that correspond to a specific range of travel such that the driver feels different resistance or haptics based on how fast the pedal is being depressed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An emulator assembly comprising:
a housing having a cavity, the housing includes components for a Hall Effect sensing and includes components for inductive sensing;
a pedal arm at least partially received in the cavity, the pedal arm having a pedal pad on one end;
an elongated member extending and coupled to the pedal arm on one end and coupled to a carrier on an opposite other end;
an end plate spaced apart from the carrier; and
a compressible member positioned in the space between the carrier and the end plate,
wherein when the pedal pad is depressed, the elongated member moves the carrier in a direction towards the end plate which drives the carrier into the compressible member such that the compressible material compresses into a compressed state to generate a force feedback onto a foot positioned on the pedal pad.

2. The emulator assembly of claim 1, wherein the housing is mounted to a floor.

3. The emulator assembly of claim 1, wherein the compressible member is tubular shaped.

4. The emulator assembly of claim 3, wherein the compressible member has a bore extending from a first surface that receives a rod extending form the carrier and an opposite second surface that is in contact with the end plate in the compressed state.

5. The emulator assembly of claim 3, wherein the compressible member is formed from a microcellular foam.

6. The emulator assembly of claim 1, wherein the housing is two-halves, one half includes components for the Hall effect sensing and the other half includes components for the inductive sensing.

7. The emulator assembly of claim 6, wherein each half of the housing includes an arcuate wall portion that forms a tubular housing portion, the carrier, the compressible member and the end plate are housed within the tubular housing portion.

8. The emulator assembly of claim 1, further comprising:
a second end plate spaced apart from the end plate,
wherein the second end plate having a second compressible member extending from the second end plate into the space between the second end plate and the end plate such that the second compressible member is positioned between the second end plate and the end plate.

9. The emulator assembly of claim 8, wherein the second compressible member has a stiffness characteristic greater than the compressible member.

10. The emulator assembly of claim 8, wherein the second compressible member is formed from a silicone rubber.

11. The emulator assembly of claim 8, wherein when the compressible member is fully compressed, the carrier, the compressible member, and the first end plate compress against the second compressible member to generate a second force feedback onto the foot on the pedal pad, the second force feedback provides a greater hepatic force than the force feedback.

12. A pedal assembly comprising:
a housing having a cavity, the housing includes components for a Hall Effect sensing and includes components for inductive sensing;
a pedal arm at least partially received in the cavity, the pedal arm having a pedal pad on one end;
an elongated member extending and coupled to the pedal arm and to an emulator assembly positioned within the cavity, the emulator assembly having: a carrier coupled to the elongated member;
a first end plate spaced apart from the carrier;
a first compressible member positioned in the space between the carrier and the first end plate; and
a second end plate spaced apart from the first end plate, the second end plate having a second compressible member extending from the second end plate into the space between the second end plate and the first end plate to be positioned between the second end plate and the first end plate,
wherein when the pedal pad is depressed, the elongated member moves the carrier in a direction towards the first end plate which drives the carrier into the first compressible member such that the first compressible member compresses into a compressed state to generate a force feedback to a foot on the pedal pad and when the first compressible member is fully compressed, the carrier, the first compressible member, and the first end plate compress against the second compressible member to generate a second force feedback onto the foot on the pedal pad, the second force feedback providing a greater hepatic force than the force feedback.

13. The pedal assembly of claim 12, wherein the housing is mounted to a floor.

14. The pedal assembly of claim 12, wherein the first compressible member is tubular shaped.

15. The pedal assembly of claim 14, wherein the first compressible member has a bore extending from a first surface that receives a rod extending from the carrier and an opposite second surface that is in contact with the first end plate.

16. The pedal assembly of claim 14, wherein the first compressible member is formed from a microcellular foam.

17. The pedal assembly of claim 12, wherein the housing is two-halves, one half includes components for the Hall effect sensing and the other half includes components for the inductive sensing.

18. The pedal assembly of claim 17, wherein each half of the housing includes an arcuate wall portion that forms a tubular housing portion, the carrier, the first compressible member, the first end plate, the second compressible member and the second end plate are housed within the tubular housing portion.

19. The pedal assembly of claim 12, wherein the second compressible member is formed from a silicone rubber.

20. An emulator assembly comprising:
a housing having a cavity, the housing includes components for a Hall Effect sensing and includes components for inductive sensing;
an elongated member extending and coupled to a moveable member at on one end and coupled to a carrier on an opposite other end, the carrier is positioned to be movable within the cavity;
an end plate positioned within the cavity;
a first compressible member positioned within the cavity, the first compressible member having a density range from 200 kilogram per cubic meter (kg/m3) to 500 kg/m3; and
a second compressible member positioned within the cavity and having a stiffness characteristic of at least 150 newton-millimeters (N/mm).

* * * * *

UNITED STATES PATENT AND TRADEMARK OFFICE
CERTIFICATE OF CORRECTION

PATENT NO. : 11,787,373 B2
APPLICATION NO. : 17/825454
DATED : October 17, 2023
INVENTOR(S) : Dan O'Neill It is certified that error appears in the above-identified patent and that said Letters Patent is hereby corrected as shown below:

In the Specification

In Column 2, Line(s) 7-8, after "greater", delete "hepatic" and insert -- haptic --, therefor.

In Column 2, Line(s) 8, after "the", delete "hepatic" and insert -- haptic --, therefor.

In Column 3 Line(s) 26, delete "hepatic" and insert -- haptic --, therefor.

In Column 4, Line(s) 4, delete "hepatic" and insert -- haptic --, therefor.

In Column 4, Line(s) 5, delete "hepatic" and insert -- haptic --, therefor.

In Column 10, Line(s) 65, after "or" delete "hepatic" and insert -- haptic --, therefor.

In Column 10, Line(s) 65, after "or" delete "hepatic" and insert -- haptic --, therefor.

In Column 10, Line(s) 67, after "or" delete "hepatic" and insert -- haptic --, therefor.

In Column 14, Line(s) 52 delete "treads" and insert -- threads --, therefor.

In Column 15, Line(s) 26 delete "hepatic" and insert -- haptic --, therefor.

In Column 15, Line(s) 50, delete "hepatic" and insert -- haptic --, therefor.

In the Claims

In Column 16, Line(s) 63, Claim 5, delete "form" and insert -- from --, therefor.

In Column 16, Line(s) 63, Claim 11, delete "first" therefor.

Signed and Sealed this
Ninth Day of January, 2024

*Katherine Kelly Vidal*

Katherine Kelly Vidal
*Director of the United States Patent and Trademark Office*

CERTIFICATE OF CORRECTION (continued)
U.S. Pat. No. 11,787,373 B2

In Column 16, Line(s) 66, Claim 11, delete "hepatic" and insert -- haptic --, therefor.

In Column 17, Line(s) 32, Claim 12, delete "hepatic" and insert -- haptic --, therefor.